United States Patent
Lee et al.

(10) Patent No.: US 9,848,227 B2
(45) Date of Patent: Dec. 19, 2017

(54) APPARATUS AND METHOD FOR CONFIGURING BIDIRECTIONAL CHANNEL IN MEDIA SERVICE

(71) Applicant: Innopia Technologies, Inc., Seongnam-si, Gyeonggi-do (KR)

(72) Inventors: Chang Keel Lee, Seongnam-si (KR); Dong Yoon Jang, Gyeonggi-do (KR)

(73) Assignee: INNOPIA TECHNOLOGIES, INC., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 15/267,004

(22) Filed: Sep. 15, 2016

(65) Prior Publication Data

US 2017/0214955 A1   Jul. 27, 2017

(30) Foreign Application Priority Data

Jan. 26, 2016 (KR) .................. 10-2016-0009492

(51) Int. Cl.
  H04N 21/235  (2011.01)
  H04N 21/2668 (2011.01)
  H04N 21/27   (2011.01)
  H04N 21/422  (2011.01)
  H04N 21/2362 (2011.01)
  H04N 21/434  (2011.01)
  H04N 21/442  (2011.01)
  H04N 21/466  (2011.01)
  H04N 21/643  (2011.01)

(52) U.S. Cl.
  CPC ..... *H04N 21/42201* (2013.01); *H04N 21/235* (2013.01); *H04N 21/2362* (2013.01); *H04N 21/2668* (2013.01); *H04N 21/27* (2013.01); *H04N 21/4345* (2013.01); *H04N 21/44218* (2013.01); *H04N 21/44222* (2013.01); *H04N 21/4668* (2013.01); *H04N 21/64322* (2013.01)

(58) Field of Classification Search
  None
  See application file for complete search history.

(56) References Cited

U.S. PATENT DOCUMENTS

| | | | | |
|---|---|---|---|---|
| 2003/0212997 A1* | 11/2003 | Hejna, Jr. | ........ | H04N 21/47217 725/88 |
| 2006/0195554 A1* | 8/2006 | Payne | .................. | G08B 25/085 709/219 |
| 2012/0221740 A1* | 8/2012 | Arsenio | .............. | H04L 65/4076 709/231 |
| 2014/0118159 A1* | 5/2014 | Fish | ........................ | G08C 17/02 340/870.01 |
| 2014/0143785 A1* | 5/2014 | Mistry | .................... | G06F 1/163 718/104 |

(Continued)

*Primary Examiner* — Ricky Chin
(74) *Attorney, Agent, or Firm* — Koppel, Patrick, Heybl & Philpott (57) ABSTRACT

A method for configuring a bidirectional channel is provided. The method includes collecting user information from a user terminal and collecting sensor information from a plurality of devices, generating a user virtual channel based on the user information and the sensor information, receiving broadcast service information from a broadcast server, extracting content associated with the user virtual channel from the user information, the sensor information, and the broadcast service information, and outputting the extracted content to the user virtual channel based on a format.

1 Claim, 7 Drawing Sheets

(56) References Cited

U.S. PATENT DOCUMENTS

| | | | |
|---|---|---|---|
| 2014/0266782 A1* | 9/2014 | You | G06F 19/3493 340/870.03 |
| 2014/0297395 A1* | 10/2014 | Chao | G06Q 30/0201 705/14.41 |
| 2016/0321935 A1* | 11/2016 | Mohler | G09B 5/08 |

* cited by examiner

APPARATUS AND METHOD FOR CONFIGURING BIDIRECTIONAL CHANNEL IN MEDIA SERVICE

CROSS-REFERENCE TO RELATED APPLICATIONS

A claim for priority under 35 U.S.C. §119 is made to Korean Patent Application No. 10-2016-0009492 filed Jan. 26, 2016, in the Korean Intellectual Property Office, the entire contents of which are hereby incorporated by reference.

BACKGROUND

Embodiments of the inventive concepts described herein relate to methods for configuring bidirectional channels in media services, and more particularly, relate to methods for enhancing satisfaction of users by providing channels suitable of their concerns.

In general, channels are transmission paths of radio waves assigned to media service providers (e.g., broadcasting companies). Programs for channels are configured by media service providers.

Meanwhile, recently, as high speed Internet services have become more common, a variety of services using the Internet have been provided. Particularly, there has been a rapidly growing trend towards the demand for Internet protocol television (IPTV) services which provide broadcast services via the Internet.

Conventional broadcast services are provided in a unidirectional manner which provides the same broadcast service to all users. It is uncomfortable for users to search for desired content among broadcast services which may be provided.

SUMMARY

Embodiments of the inventive concepts provide a method for configuring a bidirectional channel in a media service.

Embodiments of the inventive concepts provide a method for generating a user virtual channel based on user information and sensor information and providing content associated with a user to the generated user virtual channel.

One aspect of embodiments of the inventive concept is directed to provide a method for configuring a bidirectional channel. The method may include collecting user information from a user terminal and collecting sensor information from a plurality of devices, generating a user virtual channel based on the user information and the sensor information, receiving broadcast service information from a broadcast server, extracting content associated with the user virtual channel from the user information, the sensor information, and the broadcast service information, and outputting the extracted content to the user virtual channel based on a format.

The method may further include storing the content to be output to the user virtual channel. The storing of the content to be output to the user virtual channel may include generating a broadcast service information table for storing the broadcast service information sent from the broadcast server and generating an expansion table for storing the content to be provided to the user virtual channel.

The storing of the content to be output to the user virtual channel may include storing metadata for content to be provided to each channel in the broadcast service information table which stores the broadcast service information and storing metadata for the content to be provided to the user virtual channel in the expansion table.

The extracting of the content associated with the user virtual channel from the user information, the sensor information, and the broadcast service information may include extracting content associated with the user virtual channel from broadcast service information streamed from the broadcast server based on meta data added to the broadcast service information and extracting content associated with the user virtual channel from information collected from the user terminal and the plurality of devices based on metadata included in the information.

The extracting of the content associated with the user virtual channel from the user information, the sensor information, and the broadcast service information may include converting sensor information accumulated for a time from a sensor into a graph object on a per-day and per-hour basis, generating a photo and a video stored in the user terminal in the form of a slide show, and automatically reproducing the photo and the video in the form of the slide show if the user virtual channel is selected or generating mash-up content associated with the user virtual channel from at least one of text, a found result for a keyword used for a search, or additional service content which interworks with each of a plurality of apps of the user terminal.

The outputting of the extracted content to the user virtual channel based on the format may include outputting the content associated with the user virtual channel via an output device in response to receiving selection of the user virtual channel from a user of the user terminal.

The outputting of the extracted content to the user virtual channel based on the format may include automatically updating content provided to the user virtual channel based on a command manually provided from the user or at intervals of a time and providing the updated content to the output device in the form of at least one of a full screen output for single content or a screen division output for a plurality of content based on an output format defined by the user.

The generating of the user virtual channel based on the user information and the sensor information may include providing an interface for generating the user virtual channel and generating the user virtual channel as information associated with a user of the user terminal is received from the interface.

Another aspect of embodiments of the inventive concept is directed to provide an apparatus for configuring a bidirectional channel. The apparatus may include a collection unit configured to collect user information from a user terminal and to collect sensor information from a plurality of devices, a channel unit configured to generate a user virtual channel based on the user information and the sensor information, a broadcast unit configured to receive broadcast service information from a broadcast server, and a controller configured to extract content associated with the user virtual channel from the user information, the sensor information, and the broadcast service information and to output the extracted content to the user virtual channel based on a format.

The apparatus may further include an input unit configured to provide an interface for generating the user virtual channel and to generate the user virtual channel as information associated with a user of the user terminal is received from the interface and a storage unit configured to store the content to be output to the user virtual channel. The storage unit may generate a broadcast service information table for storing the broadcast service information sent from the broadcast server, may generate an expansion table for storing the content to be provided to the user virtual channel, may store metadata for content to be provided to each channel in the broadcast service information table which stores the broadcast service information, and may store metadata for the content to be provided to the user virtual channel in the expansion table.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereinafter, a description will be given in detail for exemplary embodiments of the inventive concept with reference to the accompanying drawings.

Figure 1:
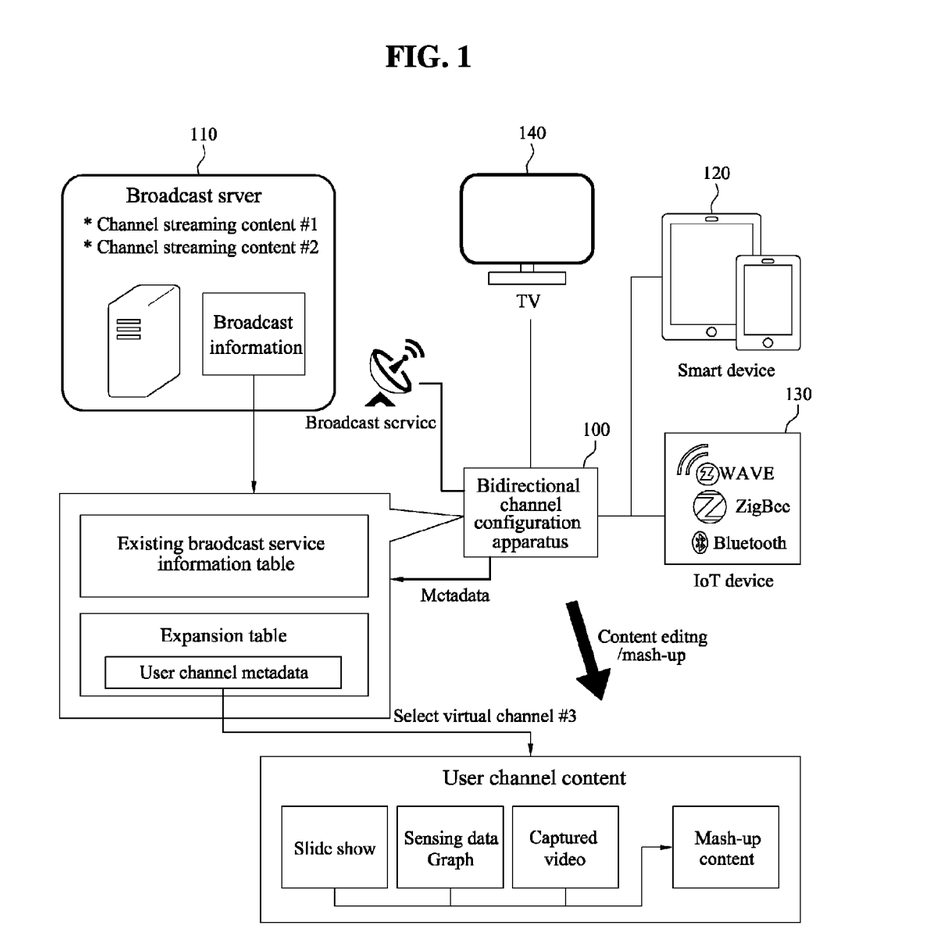
FIG. 1 is a drawing illustrating an operation of a bidirectional channel configuration apparatus according to an exemplary embodiment.

FIG. 1 is a drawing illustrating an operation of a bidirectional channel configuration apparatus according to an exemplary embodiment.

A bidirectional channel configuration apparatus 100 may be to configure a bidirectional channel and may be provided to output a user virtual channel to an output device 140 (e.g., a television (TV)). The bidirectional channel configuration apparatus 100 may refer to a server and may be a set-top box. Also, the bidirectional channel configuration apparatus 100 may be implemented through operations of the server and the set-top box. For example, the set-top box may collect user information and sensor information and may send the information to the server. Therefore, the server may configure a user virtual channel and may provide content to the user virtual channel.

The bidirectional channel configuration apparatus 100 may collect user information from a smart device 120. The bidirectional channel configuration apparatus 100 may collect user identification information and user concern information, and the like from the smart device 120.

The smart device 120 may be a device for collecting user information from the user and may be a mobile terminal or a fixed terminal. For example, the smart device 120 may include a smartphone, a mobile phone, a navigation device, a computer, a laptop computer, a digital broadcast terminal, a personal digital assistant (PDA), a portable multimedia portable (PMP), a tablet personal computer (PC), or the like.

The bidirectional channel configuration apparatus 100 may collect sensor information from a plurality of devices. The bidirectional channel configuration apparatus 100 may obtain sensor information from sensors mounted on a plurality of devices. The bidirectional channel configuration apparatus 100 may collect sensor information from an Internet of things (IoT) device 130. The bidirectional channel configuration apparatus 100 may collect, for example, sensor information from a Z-Wave device, a Zigbee device, and other network protocol enabled devices.

The bidirectional channel configuration apparatus 100 may generate a user virtual channel based on the user information and the sensor information.

The bidirectional channel configuration apparatus 100 may receive broadcast service information from a broadcast server 110. Streaming content corresponding to a channel may be sent from the broadcast server 110 to the bidirectional channel configuration apparatus 100. In this case, the streaming content corresponding to the channel may include metadata.

The bidirectional channel configuration apparatus 100 may generate and store a broadcast service information table by receiving broadcast service information from the broadcast server 110. For example, the bidirectional channel configuration apparatus 100 may store an existing broadcast service information table and an expansion table. The bidirectional channel configuration apparatus 100 may store metadata for content associated with each channel in the existing broadcast service information table. Also, the bidirectional channel configuration apparatus 100 may store metadata for content to be provided to a user virtual channel in the expansion table.

The bidirectional channel configuration apparatus 100 may extract content associated with the user virtual channel from broadcast service information streamed from the broadcast server 110 based on metadata added to the broadcast service information and may extract content associated with the user virtual channel from information collected from the smart device 120 and the IoT device 130 based on metadata included in the information.

The bidirectional channel configuration apparatus 100 may convert sensor information accumulated for a period of time from sensors into a graph object on a per-day and per-hour basis and may generate mash-up content associated with a user virtual channel from at least one of a photo, text, and a video stored in the smart device 120.

The bidirectional channel configuration apparatus 100 may extract content associated with the user virtual channel from user information and sensor information. Also, the bidirectional channel configuration apparatus 100 may generate and edit content associated with the user virtual channel.

The bidirectional channel configuration apparatus 100 may provide content associated with the user virtual channel based on the metadata store in each of the existing broadcast service information table and the expansion table in response to receiving selection of the user virtual channel from the user. The bidirectional channel configuration apparatus 100 may be provided to output content to the output device 140.

Figure 2:
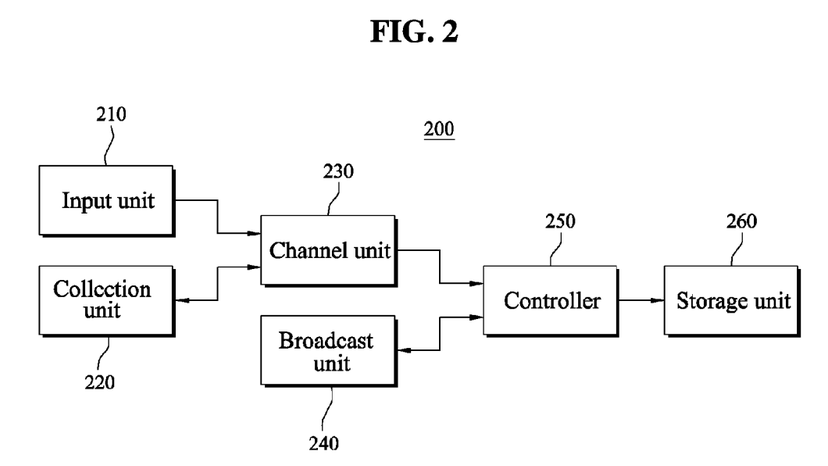
FIG. 2 is a block diagram illustrating a configuration of a bidirectional channel configuration apparatus according to an exemplary embodiment.

FIG. 2 is a block diagram illustrating a configuration of a bidirectional channel configuration apparatus according to an exemplary embodiment.

A bidirectional channel configuration apparatus 200 may be for providing a bidirectional channel-type service and may include an input unit 210, a collection unit 220, a channel unit 230, a broadcast unit 240, a controller 250, and a storage unit 260.

The input unit 210 may provide an interface for generating a user virtual channel and may receive information associated with a user of the user terminal. The input unit 210 may generate a user virtual channel based on information input from the user by receiving a command for generating the user virtual channel from the user.

The collection unit 220 may obtain user information from the user terminal and may obtain sensor information from a plurality of devices. For example, the collection unit 220 may obtain user identification information, user concern information, and the like from the user terminal and may obtain sensor information from sensors such as an IoT device, a smart device, and a wearable device. Alternatively, the collection unit 220 may process the sensor information obtained from the plurality of devices.

The channel unit 230 may generate a user virtual channel based on the user information and the sensor information.

The broadcast unit 240 may receive broadcast service information from a broadcast server.

The controller 250 may extract content associated with the user virtual channel from the user information, the sensor information, and the broadcast service information. The controller 250 may extract content associated with the user virtual channel from broadcast service information streamed from the broadcast server based on metadata added to the broadcast service information and may extract content associated with a user virtual channel from information collected from the user terminal and the plurality of devices based on metadata included in the information.

The controller 250 may convert sensor information accumulated for a time from sensors into a graph object on a per-day and a per-hour basis and may generate mash-up content associated with the user virtual channel from at least one of a photo, text, and a video stored in the user terminal.

The controller 250 may be provided to output content associated with the user virtual channel via an output device in response to receiving selection of the user virtual channel from the user. The controller 250 may automatically update content provided to the user virtual channel at intervals of a time and may output the updated content to the output device.

The storage unit 260 may store content to be output to the user virtual channel. The storage unit 260 may generate a broadcast service information table which stores the broadcast service information sent from the broadcast server and may generate an expansion table which stores the content to be provided to the user virtual channel. The storage unit 260 may store metadata for content to be provided to each channel in the broadcast service information table which stores the broadcast service information and may store metadata for content to be provided to the user virtual channel in the expansion table. The storage unit 260 may store content for a user virtual channel of the latest state to provide the content when a service is requested.

Figure 3:
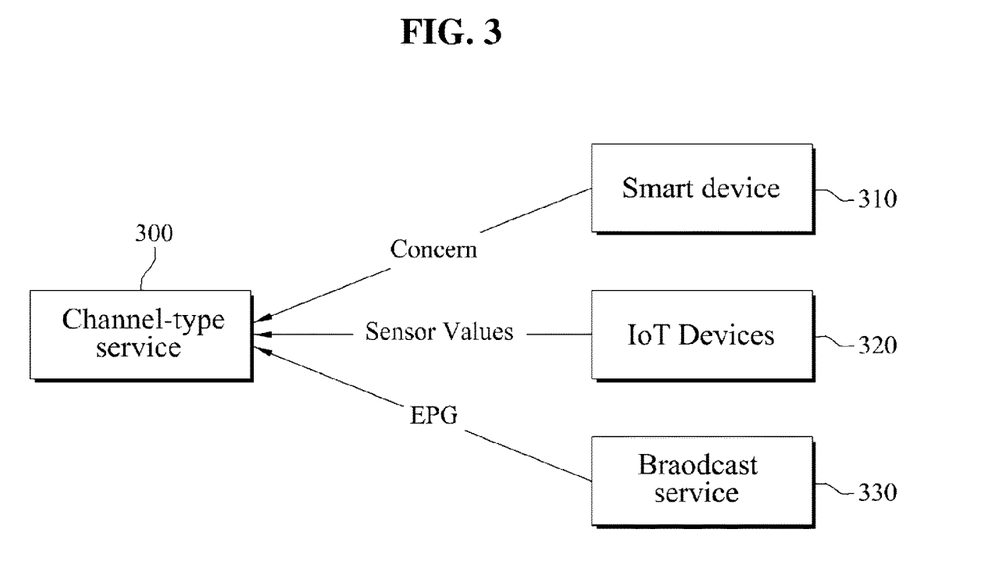
FIG. 3 is a drawing illustrating a process of collecting information of a media service in a bidirectional channel configuration apparatus according to an exemplary embodiment.

FIG. 3 is a drawing illustrating a process of collecting information of a media service in a bidirectional channel configuration apparatus according to an exemplary embodiment.

The bidirectional channel configuration apparatus may provide a channel-type service 300 by generating a user virtual channel based on user information and sensor information. The bidirectional channel configuration apparatus may provide the channel-type service 300 by generating a user virtual channel and searching for content associated with the user virtual channel from user information, sensor information, and broadcast service information.

The bidirectional channel configuration apparatus may collect concerns of a user from a smart device 310, may collect sensor values from an IoT device 320, and may collect EPG information from a broadcast service 300.

In other words, it is assumed that the user virtual channel is a channel associated with a "diet". The bidirectional channel configuration apparatus may search for content stored in the smart device 310 and may extract content associated with the "diet" from the content stored in the smart device 310. The bidirectional channel configuration apparatus may extract text, a photo, a video, and the like associated with the "diet" from text, photos, videos, and the like stored in the smart device 310.

The bidirectional channel configuration apparatus may obtain information associated with the "diet" from each of sensors of the IoT device 320. The bidirectional channel configuration apparatus may obtain sensor information from devices, such as an IoT device, a wearable device, and a smart device, which mount sensors. For example, the sensors may include a global positioning system (GPS) sensor, a heart rate sensor, a humidity sensor, a temperature sensor, and the like.

The bidirectional channel configuration apparatus may generate information associated with the "diet" by combining the information obtained from the sensors of the IoT device 320. The bidirectional channel configuration apparatus may collect sensor information obtained from the IoT device 320, for example, heart rate information of the user, a movement path of the user, sleep pattern information of the user, temperature information of the user, and the like. The bidirectional channel configuration apparatus may generate a graph based on the sensor information.

The bidirectional channel configuration apparatus may separately classify broadcast service information associated with the "diet" from broadcast service information streamed from the broadcast server. The bidirectional channel configuration apparatus may obtain an EPG, for example, schedule information of content associated with the "diet", detailed information for each episode, and the like.

The bidirectional channel configuration apparatus may be provided to output content, extracted from user information, sensor information, and broadcast service information, to a user virtual channel in a format. The bidirectional channel configuration apparatus may provide the channel-type service 300 by mapping one channel of a TV (e.g., channel 999) to the user virtual channel.

Figure 4:
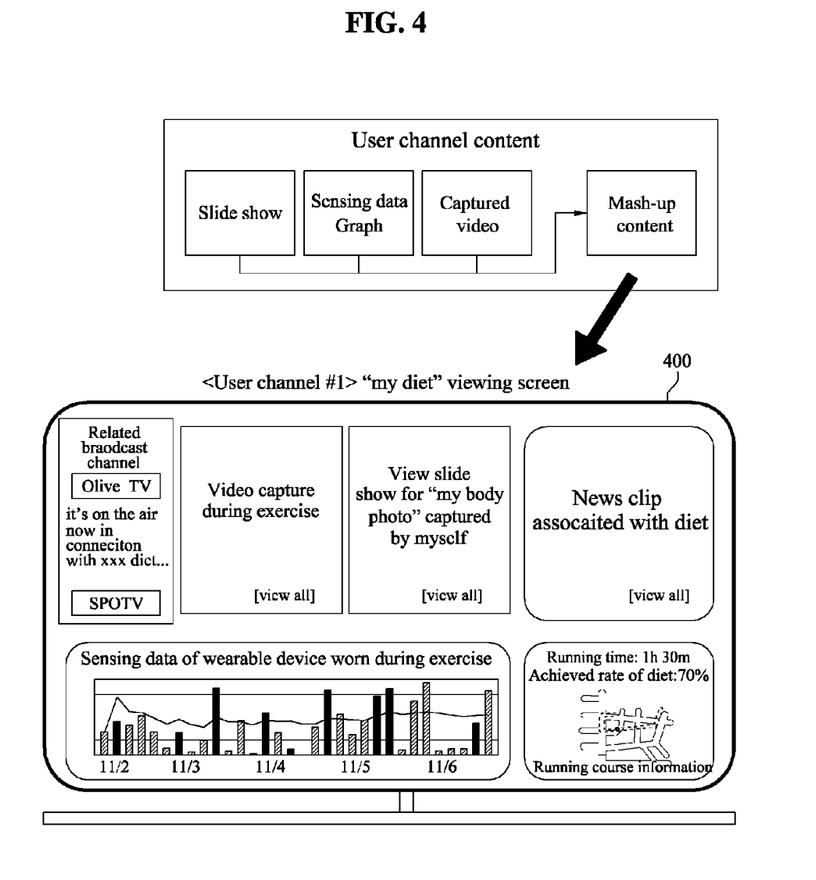
FIG. 4 is a drawing illustrating a process of generating a user virtual channel in a bidirectional channel configuration apparatus according to an exemplary embodiment.

FIG. 4 is a drawing illustrating a process of generating a user virtual channel in a bidirectional channel configuration apparatus according to an exemplary embodiment.

The bidirectional channel configuration apparatus may provide a user virtual channel to an output device 400 (e.g., a TV) and may provide mash-up content to the user virtual channel. For example, a user terminal may send a photo, a video, and the like of a category associated with the user virtual channel to the bidirectional channel configuration apparatus and may send found result information based on keywords frequently used on the day by a user of the user terminal to the bidirectional channel configuration apparatus. Also, sensor information of an IoT device worn on the user may be sent to the bidirectional channel configuration apparatus over a home wireless network, for example, if he or she returns home after going out. The bidirectional channel configuration apparatus may convert sensor information accumulated for a time from sensors into a graph object on a per-day and per-hour basis and may provide an automatically reproduced video or a sequentially output slide show by selecting at least one of a photo, text, and a video stored in the user terminal, or may provide mash-up content to the user virtual channel.

The bidirectional channel configuration apparatus may be provided to extract broadcast service information corresponding to a category associated with the user virtual channel and to output the extracted broadcast service information to the output device 400. Also, the bidirectional channel configuration apparatus may configure a photo, text, and a video downloaded from the user terminal as a slide show and the like and may provide the slide show and the like.

The bidirectional channel configuration apparatus may map the user virtual channel to a specific region of a channel. Referring to FIG. 4, a user virtual channel may be generated in user channel #1. For example, the user virtual channel may be generated based on a keyword entered from the user and may be automatically generated based on user information and sensor information.

The bidirectional channel configuration apparatus may provide information about user channel #1 to the user virtual channel by receiving a request to provide a service for user channel #1 from the user. The bidirectional channel configuration apparatus may provide content associated with a diet to user channel #1. The bidirectional channel configuration apparatus may provide content as a structure of a frame in FIG. 4 to user channel #1. Giving an example of user channel #1, as shown in FIG. 4, the output device 400 may output content associated with the diet. The output device 400 may output broadcast content associated with the diet, a user created video captured during an exercise, or by the user, a slide show for a photo captured by the user, a news headline with link associated with the diet, a graph for each period of time for sensor information measured during an exercise, a running course recorded with location sensor enabled wearable where the user moves during an exercise, an exercise time, an achieved rate of the user created target of exercise, and the like.

In other words, the bidirectional channel configuration apparatus may update content by inserting user information directly input from the user or life style information of the user automatically accumulated using sensors into a suitable screen location for each content to be suitable for a format of a user channel page of the user virtual channel. The bidirectional channel configuration apparatus may render content updated as the user views the user virtual channel in a state of being filled on all of a corresponding channel page and may provide the rendered content via the output device 400.

Also, the bidirectional channel configuration apparatus may first provide a user virtual channel in which content is updated to the latest content among user virtual channels as the output device 400 is powered on. Alternatively, the bidirectional channel configuration apparatus may set a channel the user wants to view as a first screen as the output device 400 is powered on.

Figure 5:
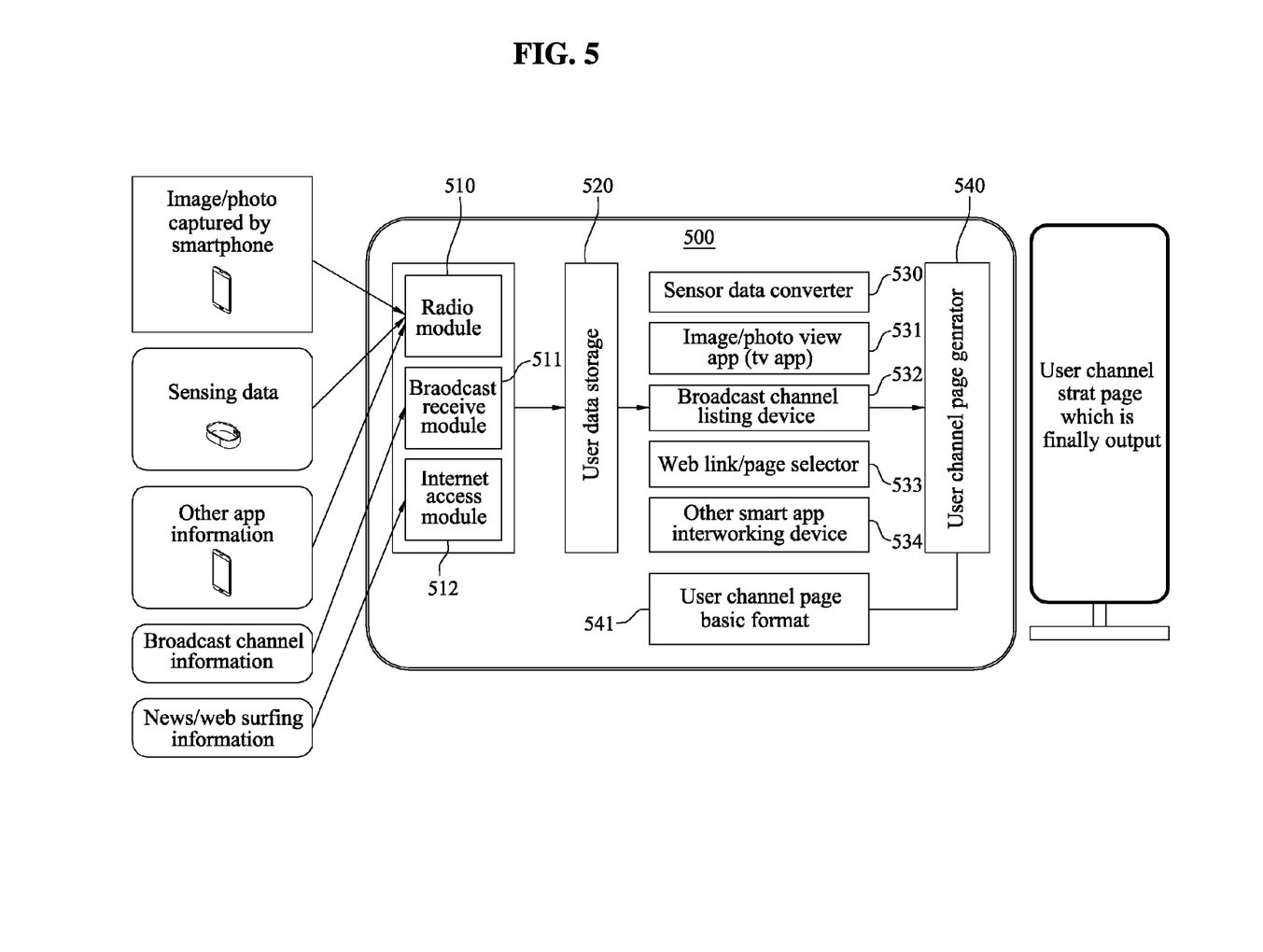
FIG. 5 is a drawing illustrating a structure of a bidirectional channel configuration apparatus according to an exemplary embodiment.

FIG. 5 is a drawing illustrating a structure of a bidirectional channel configuration apparatus according to an exemplary embodiment of the inventive concept.

A bidirectional channel configuration apparatus 500 may include a radio module 510 for transmitting and receiving a photo, a video, a slide show, and the like from information stored a user terminal (e.g., a smartphone), an IoT device, a wearable device, other applications (apps) through wireless communication (e.g., short-distance wireless communication), a broadcast receive module 511 for receiving broadcast channel information from a broadcast server, and an Internet access module 512 for transmitting and receiving news and article web surfing information via the Internet.

In this case, the radio module 510 may be software which links a specific app of each of other smartphones to a TV app previously made to directly interwork for specific purposes. For example, the radio module 510 may correspond to an app which shows an achieved rate to today's goal amount of an exercise.

The bidirectional channel configuration apparatus 500 may store information obtained from the radio module 510, the broadcast receive module 511, and the Internet access module 512 in a user data storage 520.

The bidirectional channel configuration apparatus 500 may convert sensor information accumulated for a time via a sensor data converter 530 from user information and sensor information stored in the user data storage 520 into a graphic object on a per-day and per-hour basis.

An image/photo view app (a TV app) 531 may include a general image/photo view app based on TV to be provided to reproduce a file such as a video and photo file downloaded from the smartphone or configure the file as a slide show and output the slide show.

A broadcast channel listing device 532 may refer to a module which searches for broadcast channel information matched with a previously entered word from EPG metadata based on a keyword entered as a concern of a user virtual channel by a user of the smartphone, extracts a related channel, and lists the corresponding channel.

A web link/page selector 533 may be a module which searches for top news, article information of a web portal matched with a previously entered word based on a keyword entered as a concern of a user virtual channel by the user, extracts a related article page and the like, and lists the extracted related article page in the form of a bulletin board.

Other smart app interworking device 534 may link a specific app of each of other smartphones to a TV app previously made to directly interwork for specific purposes. For example, the other smart app interworking device 534 may link an app which shows an achieved rate to today's goal amount of an exercise to the TV app.

The bidirectional channel configuration apparatus 500 may be provided to output mash-up content generated via the sensor data converter 530, the TV app 531, the broadcast channel listing device 532, the web link/page selector 533, and the other smart app interworking device 534 to a user virtual channel based on a user channel page basic format 541 via a user channel page generator 540.

Figure 6:
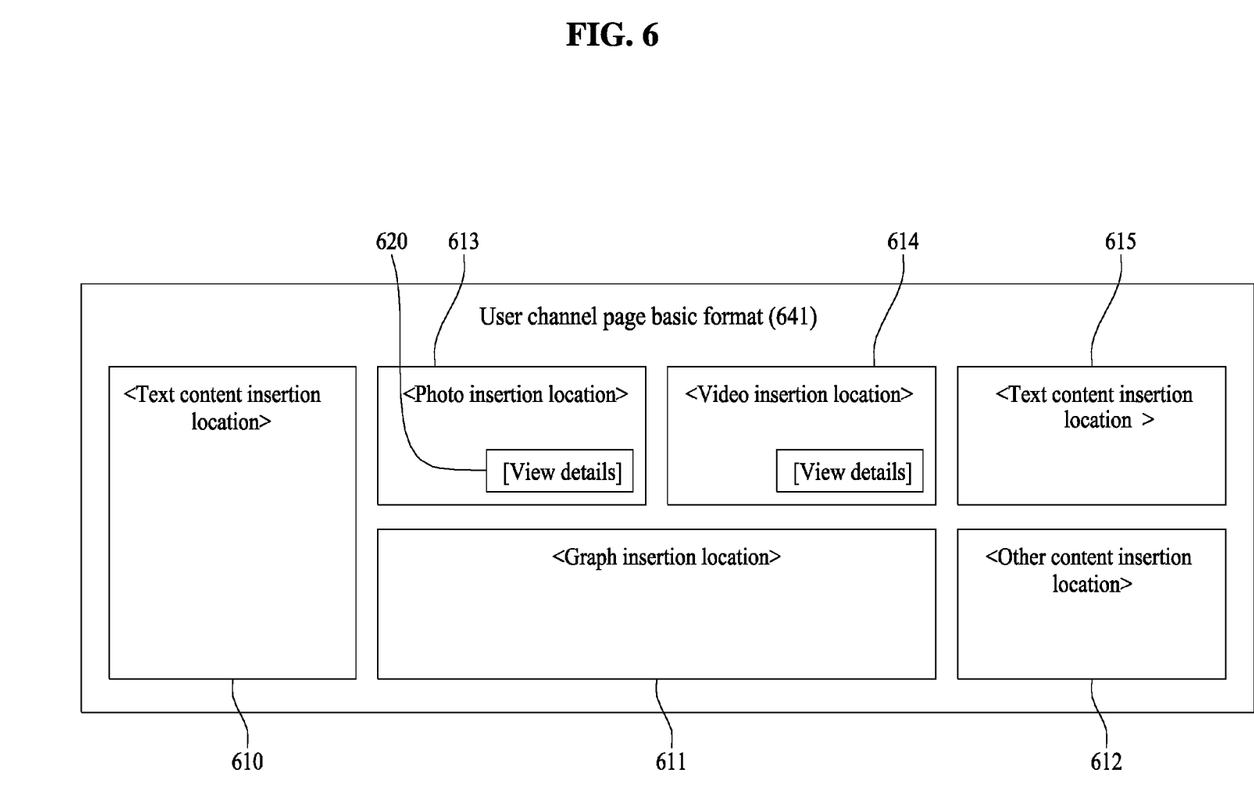
FIG. 6 is a drawing illustrating a basic format of a user virtual channel in a bidirectional channel configuration apparatus according to an exemplary embodiment.

FIG. 6 is a drawing illustrating a basic format of a user virtual channel in a bidirectional channel configuration apparatus according to an exemplary embodiment. In FIG. 6, an embodiment is exemplified as a basic format of a user virtual channel in the bidirectional channel configuration apparatus. A user channel page basic format 641 is not limited to a frame shown in FIG. 6. For example, a format for outputting mash-up content to a user virtual channel may be changed by a user.

As shown in FIG. 6, the bidirectional channel configuration apparatus may configure a channel page including real content based on the user channel page basic format 641. Each content object may be generated by being processed by each module. The bidirectional channel configuration apparatus may receive configuration content, for example, a video, a photo, a graph, text, and the like and may insert the received configuration content into a specified location based on the user channel page basic format 641. For example, the bidirectional channel configuration apparatus may insert each content into a location of the corresponding content based on a coordinate and a location tag.

The user channel page basic format 641 is configured with text content frames 610 and 615 for outputting text content, a photo frame 613 for outputting a photo, a video frame 614 for outputting a video, other content frame 612 for outputting other content, and the like. In this case, a size of each of frames may be automatically set based on a size of content, capacity of the content, and the like and may be changed by the user. In this case, corresponding content may be inserted into each of the frames to be output.

The user channel page basic format 641 may display a view details interface 620 for content necessary for a full screen or viewing details on an output device to activate the view details interface 620. For example, if a photo is output on the photo frame 613, the interface 620 for viewing the photo in detail may be provided. Only a representative photo among a plurality of photos which should be output on the photo frame 613 may be output. As the view details interface 620 is selected, a plurality of photos associated with a user virtual channel may be provided.

The bidirectional channel configuration apparatus may update content provided to a user virtual channel at intervals of a time. It is assumed that the bidirectional channel configuration apparatus connects with a user terminal and a plurality of devices through wireless communication. The bidirectional channel configuration apparatus may passively or actively update content provided to the user virtual channel.

In detail, the bidirectional channel configuration apparatus may update content by directly sending data of the user terminal and the plurality of devices from the user to the output device. As the user operates a setting of the bidirectional channel configuration apparatus, the bidirectional channel configuration apparatus may update content. The bidirectional channel configuration apparatus may mutually and automatically identify information (e.g., information about an interworking function of an app of a smartphone) from the user terminal and the plurality of devices and may verify and update newly generated content.

Figure 7:
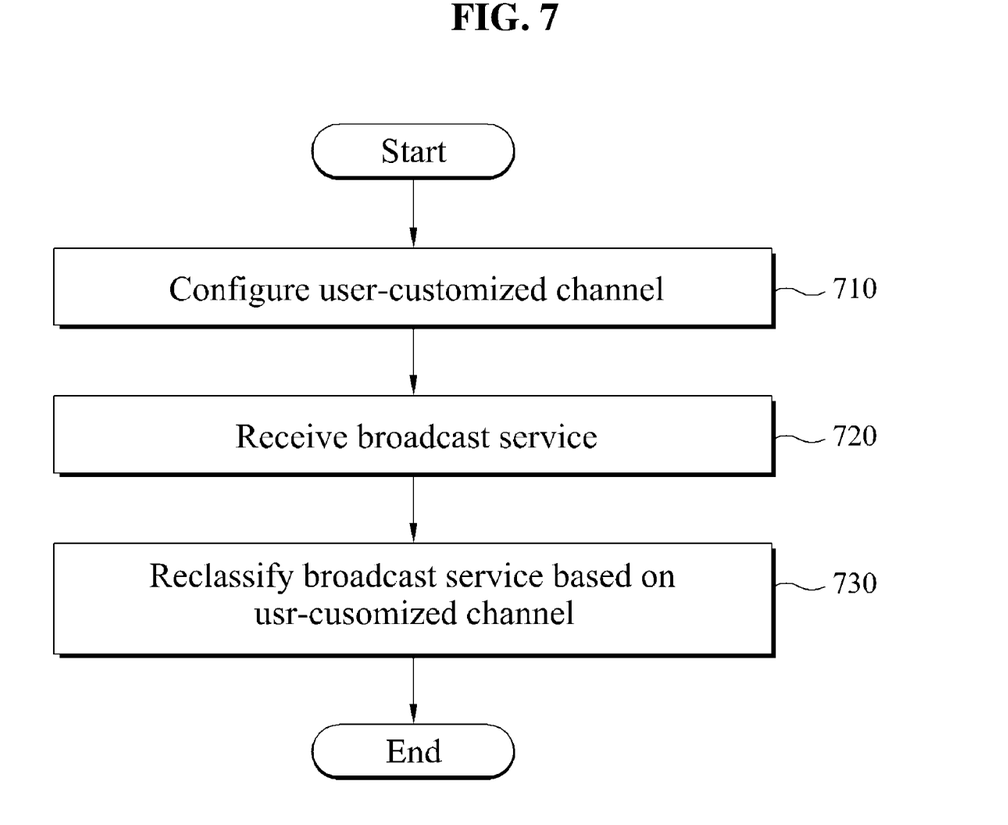
FIG. 7 is a flowchart illustrating a bidirectional channel configuration method of a bidirectional channel configuration apparatus according to an exemplary embodiment.

FIG. 7 is a flowchart illustrating a bidirectional channel configuration method of a bidirectional channel configuration apparatus according to an exemplary embodiment.

In step 710, the bidirectional channel configuration apparatus may configure a user-customized channel. The bidirectional channel configuration apparatus may configure the user-customized channel based on user information and sensor information. Alternatively, as a specific keyword is entered from a user, a user-customized channel associated with the keyword may be generated. In this case, the user-customized channel may provide a channel-type service by mapping a user virtual channel to one channel of a TV.

In step 720, the bidirectional channel configuration apparatus may receive a broadcast service from a broadcast server. The bidirectional channel configuration apparatus may collect a concern of the user, may collect sensor information from an IoT device, and may collect EPG information from the broadcast service.

In step 730, the bidirectional channel configuration apparatus may reclassify the broadcast service based on the user-customized channel. The bidirectional channel configuration apparatus may receive broadcast service information about the broadcast service from the broadcast server and may search for content associated with a user virtual channel from the user information, the sensor information, and the broadcast service information.

The bidirectional channel configuration apparatus may extract text, a photo, a video, and the like associated with the user virtual channel from text, photos, videos, and the like stored in a smartphone and may generate a graph based on the sensor information. Also, the bidirectional channel configuration apparatus may classify broadcast service information associated with the user virtual channel to be independent of broadcast service information streamed from the broadcast server.

The bidirectional channel configuration apparatus may be provided to output content extracted from the user information, the sensor information, and the broadcast service information to the user virtual channel in a format. The bidirectional channel configuration apparatus may be provided to output content associated with the user virtual channel via an output device in response to receiving selection of the user virtual channel from the user. The bidirectional channel configuration apparatus may be provided to automatically update content provided to the user virtual channel at intervals of a time and to output the updated content to the output device.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Alternatively, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described exemplary embodiments of the inventive concept may be recorded in computer-readable media including program instructions to implement various operations embodied by a computer. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Program instructions include both machine code, such as produced by a compiler, and files containing higher level code that may be executed by the computer using an interpreter. The described hardware devices may be configured to act as one or more software modules to perform the operations of the above-described exemplary embodiments of the inventive concept, or vice versa.

According to an exemplary embodiment, the bidirectional channel configuration apparatus may provide a broadcast service which focuses on a life style of the user.

According to an exemplary embodiment, the bidirectional channel configuration apparatus may reduce a waste of information the user does not want, and may increase satisfaction by securing user convenience.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A method for configuring a bidirectional channel, the method comprising:
   collecting user information from a user terminal and collecting sensor information from a plurality of devices;
   generating a user virtual channel based on the user information and the sensor information;
   receiving broadcast service information from a broadcast server;
   extracting content associated with the user virtual channel from the user information, the sensor information, and the broadcast service information; and
   outputting the extracted content to the user virtual channel based on a format;

wherein the extracting of the content associated with the user virtual channel from the user information, the sensor information, and the broadcast service information comprises:

extracting content associated with the user virtual channel from broadcast service information streamed from the broadcast server based on metadata added to the broadcast service information;

extracting content associated with the user virtual channel from information collected from the user terminal and the plurality of devices based on metadata included in the information;

converting sensor information accumulated for a time from a sensor into a graph object on a per-day and per-hour basis;

generating a photo and a video stored in the user terminal in the form of a slide show; and automatically reproducing the photo and the video in the form of the slide show if the user virtual channel is selected or generating mash-up content associated with the user virtual channel from at least one of text, a found result for a keyword used for a search, or additional service content which interworks with each of a plurality of apps of the user terminal.

* * * * *